June 13, 1939.     I. M. ROBERTS     2,161,935
COMBINED CARRYING AND POURING APPLIANCE FOR THERMOS BOTTLES AND THE LIKE
Filed April 5, 1938
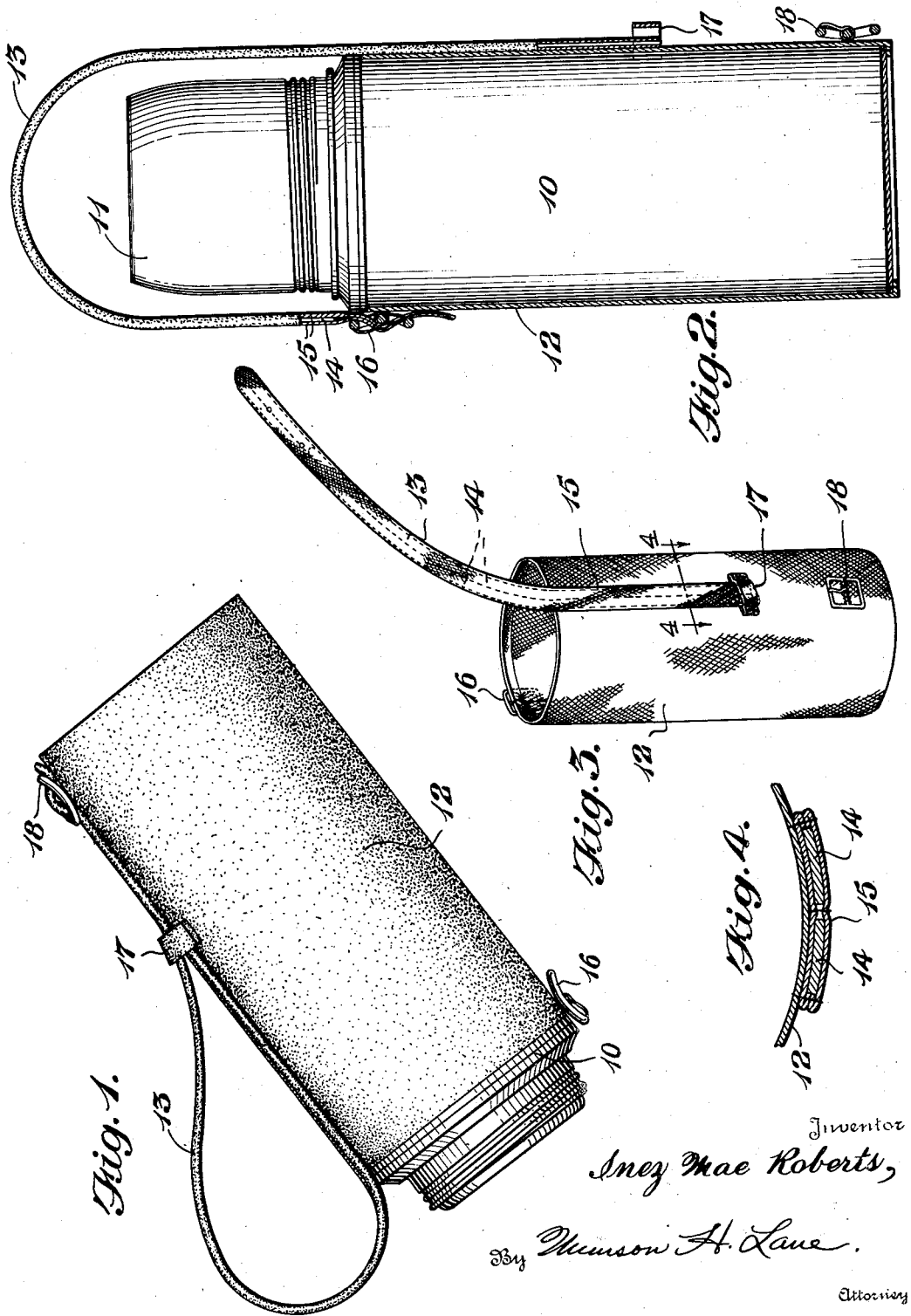

Patented June 13, 1939

2,161,935

UNITED STATES PATENT OFFICE 2,161,935

COMBINED CARRYING AND POURING APPLIANCE FOR THERMOS BOTTLES AND THE LIKE

Inez Mae Roberts, Rapid City, S. Dak.

Application April 5, 1938, Serial No. 200,229

7 Claims. (Cl. 215—12)

The invention relates to a combined carrying and pouring appliance for thermos bottles and the like.

According to the preferred embodiment of my invention I provide a flexible jacket or cover or the like, for the thermos bottle or other receptacle, which is equipped with a handle portion, adapted in one position to serve as a carrier handle for the receptacle and in another position to serve as a pouring handle.

The invention while illustrated in connection with a thermos bottle of conventional design is obviously not limited to this particular purpose.

The invention will be more readily understood by reference to the accompanying drawing wherein an illustrative embodiment is set forth by way of example and not by way of limitation.

In the drawing:

Fig. 1 is a side view illustrating a thermos bottle equipped with a flexible cover provided with a handle arranged for pouring.

Fig. 2 is a view of the thermos bottle and cover with the handle in carrying position, certain parts being shown in vertical section and others in elevation.

Fig. 3 is a detail perspective view showing the cover removed from the bottle, and Fig. 4 is a detail view on an enlarged scale on line 4—4 of Fig. 3.

Referring to the drawing, the reference numeral 10 denotes the outer wall of a thermos bottle or the like, and 11 denotes the usual removable cup-like cap which is adapted to be screwed over the mouth of the thermos bottle to cover the same or to be removed to permit pouring the contents. The thermos bottle and top may be of any desired or conventional form, the details of which, per se, form no part of the present invention, and which may be varied as desired without departing from the spirit of the present invention.

The thermos bottle or other receptacle is shown as provided with a jacket or cover 12, preferably flexible, which may be composed of leather, cloth, or other suitable material. Where a leather cover is employed the cover may be self supporting when the bottle is removed therefrom, while when cloth or the like is employed the cover may be so flexible as to collapse when the thermos bottle is removed therefrom.

According to my invention a handle 13 is provided which in the position shown in Fig. 1 is adapted for use in pouring the liquid contents from the thermos bottle or other receptacle after the cap has been removed, while in the position shown in Fig. 2 the handle is adapted for use as a carrier for the receptacle 11.

The handle portion is preferably composed of resilient material such as flexible steel strips 14, 14 covered by cloth or the like 15. The handle is shown as secured to the cover 12 for a substantial portion of its length, which may be done by stitching or in any other suitable manner. A portion of the steel reinforced handle projects beyond the stitched portion, as indicated in Fig. 3 and this projecting portion may either be curved over the top of the receptacle and its end detachably secured by any suitable means, as a buckle 16 (Fig. 2), or may be curved downwardly and passed through a loop 17, and then detachably secured by any suitable means, as the buckle 18 located near the bottom of the cover. To facilitate buckling the steel reinforcing members 14 may terminate just short of the end of the handle 13.

It will be observed that the flexible steel stays 14, while capable of being curved as indicated in Figs. 1 and 2 give stability to the handle and render it more effective both in the carrying and in the pouring positions, particularly in the latter. It will also be noted that the loop 17 which is secured about mid-way of the ends of the receptacle, locates the handle at a position where it is most effective for pouring.

The invention has been described in detail for the purpose of illustration but it will be obvious that many variations and modifications may be resorted to without departing from the spirit of the invention.

I claim:

1. In combination with a thermos bottle or the like, a cover having a handle stitched thereto, including a portion reinforced by a flexible metal strip and adapted to be secured in either a carrying or in a pouring position, and means carried by the cover for releasably securing the handle in either the carrying or pouring position.

2. In combination with a thermos bottle or the like, a cover having a handle stitched thereto, including a portion reinforced by a flexible metal strip and adapted to be secured in either a carrying or in a pouring position, said cover including a loop arranged about mid-way between the ends of the receptacle, through which a portion of the handle extends when in pouring position, and means carried by the cover for releasably securing the handle in either the carrying or in the pouring position.

3. For use with a thermos bottle or the like, a jacket having a flexible spring handle permanently secured at one end to said jacket and adapted to be positioned in either a carrying or in a pouring position, and means carried by the jacket for releasably securing the other end of the handle in either of said positions.

4. In combination with a thermos bottle or the like, a jacket for said bottle having a flexible spring handle permanently secured thereto at one end, the other end being adapated to be positioned in either a carrying or in a pouring position, and means carried by the jacket for releasably securing th free end in either of said positions.

5. In combination with a thermos bottle or the like, a jacket having a flexible spring handle secured thereto at one end, the free end being adapted to be positioned in either a carrying or in a pouring position, a loop carried by said jacket arranged intermediate the ends of the receptacle through which a portion of the handle extends when in pouring position, and means carried by the jacket for releasably securing the free end of the handle in either the carrying or in the pouring position.

6. In combination with a thermos bottle or the like, having a pouring outlet, a jacket having a flexible spring handle secured thereto, one end of which is adapted to be positioned in either a carrying or in a pouring position, a loop carried by said jacket arranged intermediate the ends of the receptacle through which a portion of the handle extends when in pouring position, a means near the bottom of the jacket below said loop for releasable securing the free end of the handle when in the pouring position, and means near the top of the jacket and arranged on the opposite side of the pouring outlet from the fixed end of the handle for releasably securing the free end of the handle when in carrying position.

7. In combination with a thermos bottle or the like having a pouring outlet, a flexible spring handle for said thermos bottle fixed at one end with reference to the pouring outlet, its free end being adapted to be releasably secured in one of two positions, on opposite sides of the pouring outlet, one for carrying purposes and the other for pouring the contents from the receptacle, and means near the bottom of the bottle below the fixed connection, for releasably securing the free end of the handle when in pouring position, and means near the top of the bottle on the opposite side of the pouring outlet from the first named means, for releasably securing the free end of the handle when in carrying position.

INEZ MAE ROBERTS.